United States Patent [19]

Howell

[11] 4,115,829

[45] Sep. 19, 1978

[54] OVERCURRENT AND GROUND FAULT RESPONSIVE TRIP UNIT FOR CIRCUIT BREAKERS

[75] Inventor: Edward Keith Howell, Simsbury, Conn.

[73] Assignee: General Electric Company, New York, N.Y.

[21] Appl. No.: 794,488

[22] Filed: May 6, 1977

[51] Int. Cl.² ............................................. H02H 3/16
[52] U.S. Cl. ........................................ 361/42; 361/44; 361/96
[58] Field of Search ................. 361/42, 44, 47, 48, 361/93, 96, 97

[56] References Cited

U.S. PATENT DOCUMENTS

| | | | |
|---|---|---|---|
| 3,328,638 | 6/1967 | Reis | 361/73 |
| 3,329,870 | 7/1967 | De Viney et al. | 361/95 |
| 3,713,005 | 1/1973 | Engel | 361/96 |
| 3,959,695 | 5/1976 | Shimp | 361/98 |

FOREIGN PATENT DOCUMENTS 464,040  4/1975  U.S.S.R. ................................. 361/93

Primary Examiner—Harry E. Moose, Jr.
Attorney, Agent, or Firm—Robert A. Cahill; Walter C. Bernkopf; Frank L. Neuhauser

[57] ABSTRACT

A circuit breaker electronic trip unit is equipped with a plurality of current transformers for sensing overcurrent and ground fault conditions in a distribution circuit. A ground fault signal voltage is applied to a differential amplifier together with an adjusted voltage establishing a desired ground fault signal pick-up level. The differential amplifier controls a variable duty cycle switch to establish charging versus discharging rates for a timing capacitor in accordance with the ground fault signal amplitude. When the voltage across the capacitor exceeds a predetermined threshold, a thyristor is triggered to draw a safe level of energizing current through a trip coil. Secondary open circuited protection is provided for any of the current transformers disposed externally of the circuit breaker.

12 Claims, 1 Drawing Figure

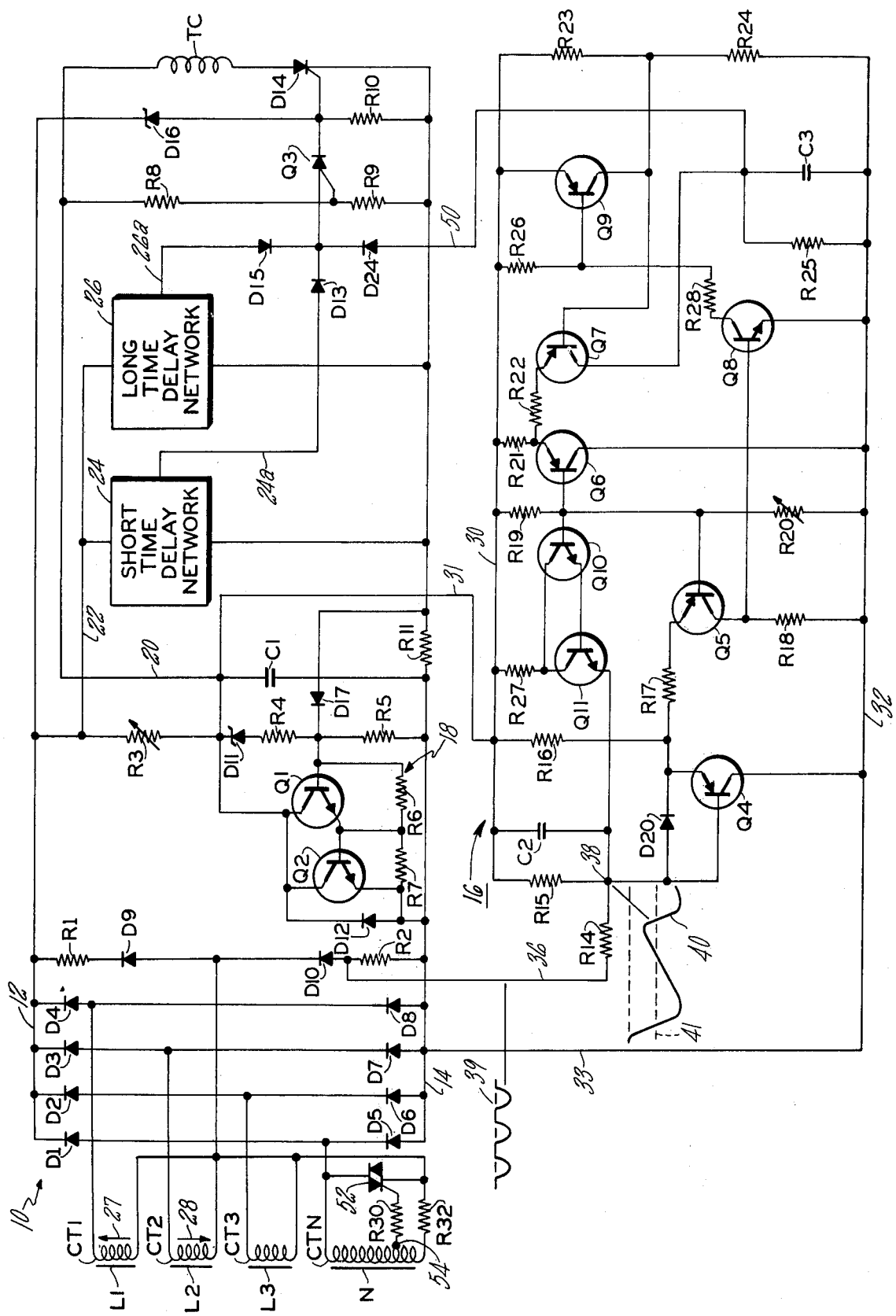

4,115,829

OVERCURRENT AND GROUND FAULT RESPONSIVE TRIP UNIT FOR CIRCUIT BREAKERS

BACKGROUND OF THE INVENTION

The present invention relates to so-called "static trip" circuit breakers, wherein the traditional thermally and magnetically activated trip devices are replaced by electronic trip unit circuitry for processing overcurrent signal information pursuant to tripping the circuit breaker instantaneously or after an appropriate delay. Such static trip breakers are becoming quite popular, particularly in industrial applications, principally because of their inherent versatility. That is, the electronic trip units are readily susceptible to convenient trip setting adjustability such that a highly repeatable trip-time curve can be rather precisely tailored to the load to be protected from overcurrents ranging from light overload to heavy short circuit proportions. Another attractive aspect of electronic trip units is that they can be readily and economically supplemented to afford highly sensitive ground fault protection.

It is accordingly an object of the present invention to provide a cost improved electronic trip unit for static trip circuit breakers.

An additional object is to provide an electronic trip unit of the above-character which includes ground fault trip circuitry of efficient design.

A further object is to provide an electronic trip unit having ground fault trip circuitry of the above-character which is capable of instituting an appropriate delay depending on the severity of the ground fault.

Yet another object of the present invention is to provide a trip unit of the above-character which is reliable in operation and safe to use.

Other objects of the present invention will in part be obvious and in part appear hereinafter.

SUMMARY OF THE INVENTION

In accordance with the present invention, there is provided an electronic trip unit for static trip circuit breakers capable of affording overcurrent and ground fault protection to an electrical power distribution circuit. The trip unit includes a plurality of current transformers for sensing the currents flowing in the conductors of the distribution circuit. The secondaries of these transformers develop current signals proportional to the currents flowing in the various conductors of the distribution circuit, which are applied via a full wave rectifying network to a pair of output buses. A first burden resistor is connected in circuit with a shunt voltage regulator for developing an overcurrent signal voltage which is applied to an overcurrent trip network. In the event of an overcurrent condition, the overcurrent trip network, with or without appropriate delay, triggers an electronic switch into conduction to draw current from the output buses to energize a trip coil pursuant to initiating a circuit breaker trip function. The trip coil energizing current also flows through a resistor connected in one of the output buses, such as to develop a voltage for controlling the shunt voltage regulator in a manner to limit the trip coil current to a safe energizing level.

A second burden resistor is also connected in circuit between the output buses, through which current flows only in the event of a ground fault on the distribution circuit. Such current produces a ground fault signal voltage across the second burden resistor for application to a ground fault trip network. This network includes a differential amplifier to which the ground fault signal voltage and an adjusted pick-up level voltage are applied. The differential amplifier controls a variable duty cycle switch operating to establish charging versus discharging rates for a timing capacitor pursuant to imposing an appropriate delay prior to initiating a trip function by triggering the electronic switch. Preferably, the pick-up level voltage and the charging current magnitude for the timing capacitor are established in concert via a common adjustment. Voltage clamping means is provided to establish a fixed maximum charging rate for the timing capacitor in face of fault signal voltages over a predetermined magnitude, thereby setting a fixed minimum time delay before initiating a ground fault trip function.

As an additional feature of the present invention, any of the current transformers stationed externally of the circuit breaker and thus connected into the trip unit via external wiring are protected from the high voltage hazard occasioned by the transformer secondary becoming open circuited. To this end, a bi-directional thyristor or Triac is connected across the transformer secondary. The Triac gate is connected to a tap on the secondary winding, while a resistor is connected between the main terminal one or reference terminal of the Triac and the secondary winding. As long as the transformer secondary is not open circuited, current flows through this resistor to offset the gate voltage at the tap, and the Triac remains non-conductive. However, should the transformer secondary become open circuited, no current flows through this resistor to offset the gate voltage. Consequently, as the voltage across the secondary rises above a predetermined level, the gate voltage becomes sufficient to trigger the Triac into conduction to relieve the high voltage condition.

The invention accordingly comprises the features of construction, combination of elements and arrangement of parts which will be exemplified in the construction hereinafter set forth, and the scope of the invention will be indicated in the claims.

For a better understanding of the nature and objects of the present invention, reference should be had to the following detailed description taken in conjunction with the accompanying drawing in which the sole FIGURE is a schematic diagram, partially in block form, of a circuit breaker trip unit construction in accordance with a preferred embodiment of the present invention.

DETAILED DESCRIPTION

Referring to the drawing, a solid state trip unit is disclosed for incorporation in a circuit breaker pursuant to providing overcurrent and ground fault protection for a four-wire power distribution circuit consisting of three line conductors L1, L2 and L3, plus a neutral conductor N. The currents in the three line conductors and neutral conductor are individually sensed by current transformers CT1, CT2, CT3 and CTN, respectively. The multi-turn secondary windings of these current transformers are connected to a diode rectifying network, generally indicated at 10, which includes diodes D1 through D4, whose cathodes are connected in common to a bus 12, and diodes D5 through D8, whose anodes are connected in common to a bus 14. The anodes of diodes D1 through D4 are respectively connected to the cathodes of diodes D5 through D8. The upper terminal of the secondary winding of current transformer CT1 is connected to the junction between diodes D4 and D8, the upper terminal of current transformer secondary CT2 is connected to the junction between diodes D3 and D7, the upper terminal of transformer secondary CT3 is connected to the junction between diodes D2 and D6, and the upper terminal of transformer secondary CTN is connected to the junction between diodes D1 and D5. The lower terminals of the four current transformer secondary windings are connected in common to the junction between diodes D9 and D10, with the cathode of diode D9 connected to bus 12 through a resistor R1 and the anode of diode D10 connected to bus 14 through a resistor R2. As will be seen, resistor R2 constitutes the burden resistor for a ground fault trip network, generally indicated at 16, while resistor R1 counterbalances the presence of resistor R2 such that the input impedance seen by the current transformers is uniform for both positive and negative half cycles of the line currents.

It will be understood that the disclosed solid state trip unit is equally adaptable to a three-wire distribution circuit, wherein the neutral conductor N is omitted, simply by omitting the neutral current transformer CTN and diodes D1 and D5.

Bus 12 is connected to bus 14 through the series combination of a variable resistor R3, a Zener diode D11, a resistor R4 and a resistor R5. The junction between resistor R3 and Zener diode D11 is by-passed to bus 14 by a shunt voltage regulator, generally indicated at 18. Specifically, this shunt voltage regulator includes a transistor Q1 whose collector is connected to the junction between resistor R3 and Zener diode D11, while its base is connected to the junction between resistors R4 and R5. A second transistor Q2 has its collector connected in common with the collector of transistor Q1 and its base connected in common with the emitter of Q1. The emitter of transistor Q2 is connected to bus 14 and also to its collector via a diode D12. The base of transistor Q1 is connected to the emitter of transistor Q2 through the series combination of resistors R6 and R7, with the junction therebetween connected to the junction between the base of transistor of Q2 and the emitter of transistor Q1.

The function of Zener diode D11 together with shunt voltage regulator 18 is to impose a regulated positive voltage of, for example, 30 volts on a supply bus 20 connected to the junction between Zener diode D11 and resistor R3. When the voltage on bus 12, which is a full wave rectified voltage proportional to the currents flowing in the distribution circuit, exceeds the breakdown voltage of Zener diode D11, current flows through resistor R4 to provide base current for transistors Q1 and Q2. These transistors turn on to shunt current flowing from bus 12 through resistor R3 around Zener diode D11 via the collector-emitter circuit of power transistor Q2. As the signal voltage on bus 12 further increases, more base current for transistor Q1 flows through diode D11 and resistor R4, increasing the conductance of transistor Q2 to divert more current to bus 14. The net result is to hold the positive voltage on bus 20 to the predetermined regulated supply level. An energy storage capacitor C1, connected between bus 20 and bus 14, is charged to this regulated voltage level.

Variable resistor R3 serves as a burden resistor for developing an overcurrent signal voltage superimposed on the regulated positive voltage level appearing on bus 20. This overcurrent signal voltage is supplied in common over bus 22 to a short time delay network 24 and a long time delay network 26. Resistor R3 is adjusted to a resistance value tailored to the current rating of the electrical load to be protected. Thus, when the load current rating is exceeded, a signal voltage proportional to the magnitude of the overcurrent is supplied to networks 24 and 26. Network 24 would typically include adjustable means for establishing a desired short time delay pick-up point. That is, this network is adjusted to a predetermined multiple of from four to eight times rated current, for example. If the overcurrent signal voltage on bus 22 exceeds the short time delay pick-up point established by network 24 and remains so for a predetermined short time delay, network 24 issues a trip signal voltage which is communicated over lead 24a and through an isolating diode D13 to the anode of a programmable unijunction transistor Q3. The voltage of this trip signal is such as to exceed the gate voltage developed at the junction of resistors R8 and R9 connected as a voltage divider across buses 20 and 14. The unijunction transistor Q3 is thus triggered into conduction to develop a triggering voltage across resistor R10 sufficient to fire a thyristor in the form of a silicon controlled rectifier D14. With silicon controlled rectifier D14 conducting, current is drawn from bus 20 through a trip coil TC which operates to effect tripping of the circuit breaker and interruption of the distribution circuit. It will be noted that the energizing current for the trip coil is derived from the current flowing through resistor R3 supplemented by discharge current from capacitor C1.

If the overcurrent signal voltage on bus 22 is representative of an overcurrent condition less than the pick-up point established by a short time delay network 24, the long time delay network 26 is relied upon to initiate a trip function after a time delay which is inversely proportional to the square of the overcurrent magnitude. Should the functioning of the long time delay network determine that a trip function is called for, a trip signal voltage is developed on lead 26a for application through an isolating diode D15 to the anode of programmable unijunction transistor Q3. This transistor fires to trigger silicon controlled rectifier D14 into conduction, and energizing current is drawn through the trip coil TC pursuant to effecting interruption of the distribution circuit. The short and long time delay networks may be of the construction shown in U.S. Pat. No. 3,786,311.

Should the overcurrent signal voltage on bus 12 be indicative of overcurrents of short circuit proportions, for example ten times rated current, an instantaneous trip function is initiated. This is achieved simply by connecting bus 12 to the gate of silicon controlled rectifier D14 through a Zener diode D16. This Zener diode is selected to have a threshold voltage which is exceeded by an overcurrent signal voltage on bus 12 indicative of short circuit currents flowing in the distribution circuit, and the resulting breakdown of the Zener diode achieves a direct and essentially instantaneous triggering of the silicon controlled rectifier D14 to draw energizing current through trip coil TC.

Since energizing current for the trip coil is derived via the current transformers from the currents flowing in the distribution circuit, high magnitude fault currents can produce excessive current flow through the trip coil. This is particularly significant if the trip coil is part of a flux shifting circuit breaker trip device. Excessive currents can cause reverse magnetization such that the plunger of the trip device will not be released to trippingly engage the circuit breaker latch. Consequently, the circuit breaker does not trip under severe fault conditions, an extremely serious situation. To prevent this situation from occuring, a small resistor R11 is connected in bus 14. The right end of this resistor is connected by a diode D17 directly to the base of transistor Q1 of shunt voltage regulator 18. When the current flowing through the trip coil from bus 20 and returning through bus 14 develops a sufficient voltage drop across resistor R11 to forward bias diode D17, additional base current is supplied to transistor Q1. This transistor goes further into conduction, as does transistor Q2, and excessive energizing current is diverted from the trip coil via the voltage regulator 18.

As noted above, resistor R2 constitutes the burden resistor for the ground fault trip network 16. As is well understood, a ground fault on the distribution circuit is manifested by an imbalance in the currents flowing in the three line conductors and the neutral conductor of the circuit. That is, under normal conditions, all of the current flowing to the load via the distribution circuit will be balanced by the currents returning from the load via the distribution circuit. However, when the circuit is experiencing a ground fault, some of the current will return to the source by an external ground circuit path, thus creating an imbalance in the currents flowing to and from the load via the line and neutral conductors of the distribution circuit.

To appreciate how a current imbalance occasioned by a ground fault produces a signal voltage across resistor R2, assume that the only current flowing in the distribution circuit is through line L1. This current produces a secondary current flowing in the assumed direction indicated by arrow 27 during positive half cycles. This secondary current then flows out the upper side of transformer secondary CT1 and through diode Dr onto bus 12. It will be observed that the only way this current can return to the lower side of current transformer secondary CT1 is through resistor R2 and diode D10. During a negative half cycle, the direction of the secondary current reverses, and the current flows out the lower side of current transformer secondary CT1 through diode D9 and resistor R1 to bus 12. The current returns to the upper side of the current transformer secondary CT1 through diode D8. It can be shown that for any differential in the currents induced in the current transformer secondaries, the current differential will flow through burden resistor R2 and through balancing resistor R1 during alternate half cycles.

To illustrate that a balanced current condition does not produce a voltage signal across resistor R2, assume that all of the current flowing in line conductor L1 to the load returns to the source through line conductor L2. The direction of the current induced in current transformer secondary CT1 is represented by the arrow 27, while the direction of the current induced in current transformer secondary CT2 is represented by the arrow 28. During one half cycle, the current 27 flows through diode D4 onto bus 12, while the current 28 flows out the lower side of current transformer secondary CT2 and into the lower side of current transformer secondary CT1. The return current on bus 14 flows through diode D7 to the upper side of current transformer secondary CT2, completing the current loop for the secondary currents 27 and 28. During the next half cycle, the directions of the currents 27 and 28 reverse. Current 27 flows out the lower side of current transformer secondary CT1 and into the lower side of current transformer secondary CT2. Current 28 flows out the upper side of current transformer secondary CT2 and onto bus 12 through diode D3. This current returns via bus 14 and diode D8 to the upper side of current transformer seondary CT1, completing the current loop. It is seen that under balanced current conditions, no current flows through resistors R1 and R2, and consequently no ground fault signal voltage is developed across resistor R2 for application to the ground fault trip circuit 16.

The ground fault trip network 16 includes a positive voltage supply bus 30 to which the regulated supply voltage on bus 20 is applied over lead 31. The essentially zero voltage reference level developed on bus 14 is applied over lead 33 to bus 32 of the ground fault trip network. The upper terminal of burden resistor R2 is connected via a lead 36 and a resistor R14 to an input terminal 38 of the ground fault trip network 16. This input terminal is referenced to the positive voltage bus 30 by resistor R15. It is seen that the resistors R2, R14 and R15 constitute a voltage divider connected between the zero voltage bus 14, which is common to bus 32, and the positive voltage supply bus 30. It will also be noted that any current flowing through burden resistor R2 occasioned by a current imbalance in the distribution circuit flows upwardly from bus 14 through diode D10, thus creating a voltage drop across this burden resistor which is negative with respect to the zero reference voltage on bus 14. This negative half-wave ground fault signal voltage, indicated graphically at 39, pulls the voltage at ground fault trip network input terminal 38 downwardly from its normal quiescent bias voltage level. A capacitor C2 is connected across resistor R15 to partially filter the negative going voltage fluctuations at junction 38, thus creating a negative going ripple signal voltage, as graphically illustrated at 40. This negative ripple voltage 40 is applied to the base of a transistor Q4 which is connected with resistor Q5 as a differential amplifier. The emitter of transistor Q4 is connected to bus 30 through a resistor R16 and to emitter of transistor Q5 through a resistor R17. The collector of transistor Q4 is connected directly to bus 32, while the collector of transistor Q5 is connected to bus 32 through resistor R18. A diode D20, connected between the base and emitter of resistor Q4, is poled to prevent reverse biasing of the base emitter junction of this transistor.

A voltage divider consisting of resistors R19 and R20 is connected between buses 30 and 32 of the ground fault trip network 16. Resistor R20 is a variable resistor which is adjusted to establish an appropriate bias voltage for application to the base of transistor Q5 pursuant to establishing a desired ground fault signal pick-up voltage. This bias voltage is also applied to the base of a transistor Q6 which is connected with transistor Q7 as a differential amplifier. The emitter of transistor Q6 is connected to bus 30 through a resistor R21 and to the emitter of transistor Q7 through a resistor R22. The collector of transistor Q6 is connected directly to bus 32, while the collector of transistor Q7 is connected to bus 32 through the parallel combination of a capacitor C3 and a resistor R25. The base of transistor Q7 is connected to the junction of resistors R23 and R24 connected as a voltage divider across buses 30 and 32. Resistor R23 is shunted by the collector-emitter circuit of a transistor Q9. The base of this transistor is connected to bus 30 through resistor R26 and to bus 32 through resistor R27 and the collector-emitter circuit of transistor Q8. The base of transistor Q8 is connected directly to the collector of transistor Q5.

In the absence of a ground fault ripple signal voltage, the quiescent voltage at input terminal 38 is at a level to bias transistor Q4 to a low conductive or essentially non-conductive state. On the other hand, transistor Q5 is biased into conduction by the voltage developed at the junction between resistors R19 and R20, and current is drawn from bus 30 through resistor R16, resistor R17 and the emitter-collector circuit of this transistor. Consequently, base drive current is available for transistor Q8, and this transistor goes into conduction to turn transistor Q9 on, which, in turn, biases transistor Q7 off. With transistor Q7 non-conductive, no current is available to charge timing capacitor C3. As a consequence, capacitor C3 is not charged, and there is no trip signal voltage developed thereacross for application over lead 40 and through diode D24 to fire unijunction transistor Q3 pursuant to triggering silicon controlled rectifier D14 to initiate a ground fault trip function.

Upon the occurrence of a ground fault in the distribution circuit, the negative ripple voltage 40 draws the voltage at input terminal 38 downwardly below the pick-up level effectively established by the adjusted resistance value of resistor R20, driving transistor Q4 into conduction. Transistor Q4 thus diverts collector current from transistor Q5, thereby depriving transistor Q8 of its source of base drive current. Transistor Q8 thus turns off, forcing transistor Q9 into non-conduction. The shunt around resistor R23 is thus removed to restore base bias for transistor Q7. This transistor goes into conduction to supply charging current for capacitor C3. The magnitude of this charging current is determined by the voltage difference between the base of transistor Q6 and the base of transistor Q7, divided by the value of resistor R22. At this point, it is significant to note that the resistance setting of resistor R20 determines the voltage at the base of transistor Q6, which then establishes the magnitude of charging current for timing capacitor C3. Consequently, resistor R20, in addition to establishing the pick-up level for the ground fault ripple signal voltage, also establishes the charging current magnitude for timing capacitor C3.

Considering the waveform 40 of the ground fault ripple signal voltage, transistor Q4 is rendered conductive only during the time that the ripple voltage peaks are negative relative to the pick-up voltage level, indicated at 41. On the other hand, during the valleys of the ripple voltage waveform 40, the pick-up voltage level 41 is more negative, and transistor Q4 is biased off, again making base drive current for transistor Q8 available at the collector of transistor Q5. Transistor Q8 turns on to disable the source of charging current for capacitor C3. A portion of the charge accumulated on this capacitor leaks off at a rate determined by the value of resistor R25. When the ground fault ripple signal voltage goes into its next negative half cycle, the pick-up voltage level is again exceeded, and transistor Q4 turns on. Transistor Q8 again turns off, and an additional increment of charge is accumulated on the timing capacitor C3. It is seen that the time interval during which the ripple peaks are more negative than the pickup voltage level increases as the ground fault signal amplitude increases. Consequently, the charging time interval for timing capacitor C3 increases, and this capacitor charges more rapidly to the voltage necessary to fire unijunction transistor Q3 pursuant to initiating a trip function. On the other hand, if the ground fault signal decreases in amplitude, the interval during which the negative peaks of the ground fault ripple signal voltage are more negative than the pick-up voltage level decreases. Consequently, the charging intervals for capacitor C3 are shortened, and it is charged by the collector current from the transistor Q7 at a slower rate. Of course, for a given ground fault signal amplitude, raising the pick-up voltage level 41 increases both the charging current magnitude and the duration of each charging current interval, while a lowering of the pick-up voltage level decreases both the charging current magnitude and the duration of each charging current interval.

It is seen that transistors Q8, Q9 and Q7 function as a variable duty cycle switch for controlling the charging and discharging rates of capacitor C3 in accordance with the amplitude of the ground fault ripple signal voltage in relation to the pickup voltage level established by the setting of resistor R20, which setting also establishes the charging current magnitude. Thus, the rate at which capacitor C3 is charged pursuant to developing a voltage sufficient to fire programmable unijunction transistor Q3 is determined by the ground fault signal amplitude.

It is deemed desirable, in order to discourage nuisance tripping, to establish a maximum charging rate for capacitor C3, such that under severe ground fault conditions, an appropriate minimum delay is instituted before a ground fault trip function is initiated. To this end, means are provided to limit the magnitude of voltage fluctuation at the ground fault trip network input terminal 38 in the face of large peak amplitude ground fault signal voltages developed across burden resistor R2. Specifically, a voltage clamp in the form of Darlington connected transistors Q10 and Q11 is connected between the junction of resistors R10 and R20 and the network input terminal 38. Thus, the base of transistor Q10 is connected to the junction of resistors R19 and R20, while its emitter is directly connected to the base of transistor Q11. The collectors of these transistors are connected in common through a resistor R27 to bus 30. The emitter transistor Q11 is connected directly to network input terminal 38. It is thus seen that the junction between resistors R19 and R20 is connected to network input terminal 38 through the base emitter junctions of transistors Q10 and Q11. As a consequence, the input terminal 38 is prevented from falling in excess of two diode voltage drops below the voltage established at the junction of resistors R19 and R20 which, in turn, establishes the pick-up voltage level 41. This clamping action in effect limits the relative peak amplitude of the ground fault ripple signal voltage 40 seen at network input terminal 38 to a predetermined maximum in the face of ground fault signal voltages of higher peak amplitudes developed across burden resistor R2. As a result, a maximum duty cycle is established for the capacitor charging switch, which, for a given pickup voltage level 41, is reflected in a predetermined maximum charging rate of capacitor C3. Accordingly, an appropriate minimum delay is imposed prior to initiating a ground fault trip function.

While the disclosed ground fault trip network 16 utilizes a common adjustment (resistor R20) for establishing the ground fault pick-up level and the magnitude of charging current for capacitor C3, it will be understood that, for a wider range of adjustability, these two settings could be established separately.

In a typical configuration, the current transformers CT1, CT2 and CT3 are packaged within the circuit breaker and thus can be readily, permanently wired into the solid state trip unit. The neutral transformer CTN, on the other hand, is typically mounted externally of the circuit breaker, thus necessitating external wiring of its secondary leads into the trip unit circuitry. Consequently, there is a significant risk that this external wiring may break, resulting in open circuiting of the neutral transformer secondary. With current flowing in the neutral conductor N, a potentially hazardous high voltage condition can exist across the open circuited secondary winding of the neutral transformer CTN. This high voltage condition presents an electrical shock hazard to personnel, as well as a hazard to the secondary winding insulation.

To protect against this contingency, a bi-directional thyristor or Triac 52 is connected across the secondary winding of neutral transformer CTN. The gate of this Triac is connected to a tap 54 on the neutral transformer secondary winding through a current limiting resistor R30. A resistor R32 is connected between the lower end of the neutral transformer secondary winding and the main terminal one or reference terminal of Triac 52.

During normal operation with the neutral transformer secondary leads intact, the current flowing through resistor R32 will produce a voltage in opposition to the voltage appearing at transformer tap 54. As a consequence, the effective gate voltage applied to Triac 52 is reduced, such that triggering is inhibited during normal operation. However, if the neutral transformer secondary winding should become open circuited, there is no voltage developed across resistor R32. When the open circuit voltage across the neutral current transformer secondary exceeds a predetermined value, for example 50 volts, the gate voltage at tap 54 is sufficient to trigger Triac 52 into conduction. As a consequence, the neutral current transformer secondary winding is short-circuited through Triac 52, thus eliminating the open circuited high voltage hazard.

It will be appreciated that the other current transformer secondary windings may also be equipped with Triac 52 should it be determined that the risks of their becoming open circuited is significant.

It will thus be seen that the objects set forth above, among those made apparent in the preceding description, are efficiently attained and, since certain changes may be made in the above construction without departing from the scope of the invention, it is intended that all matter contained in the above description or shown in the accompanying drawings shall be interpreted as illustrative and not in a limiting sense.

Having described my invention, what I claim as new and desire to secure by Letters Patent is:

1. A circuit breaker electronic trip unit comprising, in combination:
   A. current sensor means linked to the various conductors of a distribution circuit to be protected;
   B. a rectifying network connected to the output of said current sensor means;
   C. a burden resistor connected in circuit with said rectifying network for developing a half-wave rectified ground fault signal voltage proportional to an imbalance in the currents flowing in the distribution circuit;
   D. means filtering said half-wave rectified signal voltage such as to develop a ripple signal voltage;
   E. variable means establishing an adjusted ground fault signal pick-up level voltage;
   F. a differential amplifier having a first input terminal connected to receive said ripple signal voltage and a second input terminal connected to receive said pick-up level voltage;
   G. a timing capacitor and a resistor connected in parallel;
   H. a current source adjusted to supply a determined magnitude of charging current to said capacitor; and
   I. electronic switch means operating in series with said capacitor as a variable duty cycle switch under the control of said differential amplifier, said switch means being closed during the intervals the peaks of said ripple signal voltage exceeds said pick-up level voltage to permit charging of said capacitor and being open during the intervals said pick-up level voltage exceeds the valleys of said ground fault signal voltage to terminate charging of said capacitor, whereby said capacitor is charged to a trip initiating voltage at a rate determined by the amplitude of said ripple signal voltage.

2. The trip unit defined in claim 1, wherein said pickup level voltage establishing means is coupled to said current source for establishing said charging current magnitude.

3. The trip unit defined in claim 1, which further includes clamping means connected between said pickup level voltage establishing means and said first input terminal of said differential amplifier for limiting the amplitude of said ripple signal voltage peaks to a predetermined maximum, thereby establishing a maximum charging rate for said capacitor.

4. The trip unit defined in claim 3, wherein said clamping means is in the form of a pair of Darlington connected transistors.

5. The trip unit defined in claim 3, wherein said pickup level voltage establishing means is coupled to said current source for establishing said charging current magnitude.

6. An electronic trip unit for a circuit breaker operating to protect a distribution circuit against both overcurrent and ground fault conditions, said trip unit comprising, in combination:
   A. a current transformer linked to each conductor of the distribution circuit and having a secondary winding in which is developed a current signal proportional to the current flowing in the linked conductor;
   B. a rectifying network full wave rectifying said current signals for application to first and second buses;
   C. a first burden resistor connected in circuit between said first and second buses for developing a ground fault signal voltage proportional to an imbalance in the currents flowing in the conductors of the distribution circuit;
   D. ground fault trip circuitry responsive to said ground fault signal voltage for developing a ground fault trip signal;
   E. a second burden resistor and a shunt voltage regulator connected in circuit between said first and second buses,
      (1) said second burden resistor developing an overcurrent signal voltage, and (2) said shunt regulator developing at its junction with said second burden resistor a regulated voltage;

F. overcurrent trip circuitry responsive to said overcurrent signal voltage for developing an overcurrent trip signal;

G. a regulated voltage bus connected to said junction of said second burden resistor with said shunt voltage regulator;

H. a circuit breaker trip coil and a thyristor connected in series between said regulated voltage bus and one of said first and second buses,
  (1) said thyristor being triggered into conduction by the presence of either said ground fault trip signal or said overcurrent trip signal to draw energizing current through said trip coil pursuant to initiating a circuit breaker trip function; and I. a resistor connected in said one of said first and second buses for developing a voltage proportional to the trip coil energizing current, said voltage controlling the operation of said shunt regulator to limit the energization current drawn through said trip coil to a safe operating level.

7. The electronic trip unit defined in claim 6, wherein said ground fault signal voltage is a half-wave signal, and said ground fault trip circuitry includes
  (1) variable means establishing an adjusted ground fault signal pick-up level voltage,
  (2) a differential amplifier having a first input terminal connected to receive said ground fault signal voltage and a second input terminal connected to receive said pick-up level voltage,
  (3) a timing capacitor and a resistor connected in parallel,
  (4) a current source adjusted to supply a determined magnitude of charging current to said capacitor, and
  (5) an electronic switch means operating in series with said capacitor as a variable duty cycle switch under the control of said differential amplifier, said switch means being closed during the intervals said ground fault signal voltage exceeds said pick-up level voltage to permit charging of said capacitor and being open during the intervals said pick-up level voltage exceeds said ground fault signal voltage to terminate charging of said capacitor, whereby said capacitor is charged pursuant to developing said ground fault trip signal at a rate determined by the amplitude of said ground fault signal voltage.

8. The electronic trip unit defined in claim 7, wherein said pick-up level voltage establishing means is coupled to said current source for also establishing said charging current magnitude.

9. An electronic trip unit for a circuit breaker operating to protect a distribution circuit against both overcurrent and ground fault conditions, said trip unit comprising, in combination:
  A. a current transformer linked to each conductor of the distribution circuit and having a secondary winding in which is developed a current signal proportional to the current flowing in the linked conductor;
  B. A rectifying network full wave rectifying said current signals for application to first and second buses;
  C. a first burden resistor connected in circuit between said first and second buses for developing a ground fault signal voltage proportional to any imbalance in the currents flowing in the conductors of the distribution circuit;
  D. ground fault trip circuitry responsive to said ground fault signal for developing a ground fault trip signal;
  E. a second burden resistor connected in circuit between said first and second buses, said second burden resistor developing at overcurrent signal voltage;
  F. overcurrent trip circuitry responsive to said overcurrent signal voltage for developing an overcurrent trip signal;
  G. a circuit breaker trip coil and a thyristor connected in circuit between said first and second buses, said thyristor being triggered into conduction by the presence of either said ground fault trip signal or said overcurrent trip signal to draw energizing current through said trip coil pursuant to initiating a circuit breaker trip function; and
  H. means adapted to at least one of said transformer secondary windings for dissipating the high voltage hazard occasioned by said one transformer secondary becoming open circuited, said means including
    (1) a bi-directional thyristor connected across said one transformer secondary winding and having a gate,
    (2) a tap on said one secondary winding connected to said bi-directional thyristor gate, and
    (3) a resistor connected between one side of said one transformer secondary winding and said bi-directional thyristor, said resistor developing a voltage in opposition to the voltage developed at said tap such as to prevent triggering of said bi-directional thyristor into conduction so long as current is flowing in said one transformer secondary winding,
    (4) in the absence of current flowing in said one transformer secondary winding, the voltage at said tap becomes effective to trigger said bi-directional thyristor into conduction, thereby short circuiting said one transformer secondary winding.

10. The electronic trip unit defined in claim 9, which further includes a shunt voltage regulator connected in circuit with said second burden resistor between said first and second buses, said regulator developing a regulated voltage at a junction with said second burden resistor, a regulated voltage bus connected to said junction, said trip coil and thyristor connected between said regulated voltage bus and one of said first and second buses, and a resistor connected in said one bus for developing a voltage proportional to the magnitude of energization current drawn through said trip coil, said voltage controlling said regulator to limit the trip coil energization current to a safe operating level.

11. The electronic trip unit defined in claim 9, wherein said ground fault signal voltage is a half-wave signal, and said ground fault trip circuitry includes
  (1) variable means establishing an adjusted ground fault signal pick-up level voltage,
  (2) a differential amplifier having a first input terminal connected to receive said ground fault signal voltage and a second input terminal connected to receive said pick-up level voltage, (3) a timing capacitor and a resistor connected in parallel,
(4) a current source adjusted to supply a determined magnitude of charging current to said capacitor, and
(5) electronic switch means operating in series with said capacitor as a variable duty cycle switch under the control of said differential amplifier, said switch means being closed during the intervals said ground fault signal voltage exceeds said pick-up level voltage to permit charging of said capacitor and being open during the intervals said pick-up level voltage exceeds said ground fault signal voltage to terminate charging of said capacitor, whereby said capacitor is charged pursuant to developing said ground fault trip signal at a rate determined by the amplitude of said ground fault signal voltage.

12. The electronic trip unit defined in claim 10, wherein said ground fault signal voltage is a half-wave signal, and said ground fault trip circuitry includes
(1) variable means establishing an adjusted ground fault signal pick-up level voltage,
(2) a differential amplifier having a first input terminal connected to receive said ground fault signal voltage and a second input terminal connected to receive said pick-up level voltage,
(3) a timing capacitor and a resistor connected in parallel,
(4) a current source adjusted to supply a determined magnitude of charging current to said capacitor, and
(5) electronic switch means operating in series with said capacitor as a variable duty cycle switch under the control of said differential amplifier, said switch means being closed during the intervals said ground fault signal voltage exceeds said pick-up level voltage to permit charging of said capacitor and being open during the intervals said pick-up level voltage exceeds said ground fault signal voltage to terminate charging of said capacitor, whereby said capacitor is charged pursuant to developing said ground fault trip signal at a rate determined by the amplitude of said ground fault signal voltage.

* * * * *